Figure 1:
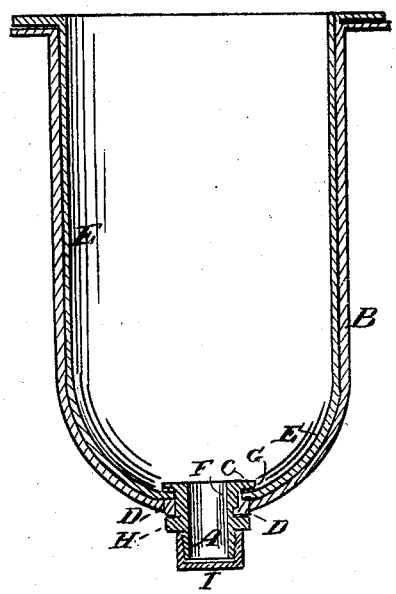
Figure 2:

W. Gee,

Soda Fountain.

No. 93,700.                  Patented Aug. 17, 1869.

Witnesses:                  Inventor:

UNITED STATES PATENT OFFICE.

WILLIAM GEE, OF NEW YORK, N. Y.

IMPROVEMENT IN SODA-FOUNTAINS.

Specification forming part of Letters Patent No. 93,700, dated August 17, 1869.

*To all whom it may concern:*

Be it known that I, WILLIAM GEE, of the city of New York, in the county and State of New York, have invented a new and useful Improvement in Soda-Water Fountains; and I do hereby declare that the following is a full, clear, and exact description thereof, which will enable others skilled in the art to make and use the same, reference being had to the accompanying drawing, forming part of this specification.

This invention relates to an improved metallic bung and stopper device for soda-water cylinders or other metallic casks, which is so constructed as to be more securely and closely fitted to and readily removed from the same than those heretofore known.

In carrying out my invention I solder a bush, D, in the hole of the shell of the cask, the said bush having a hole of any other form than circular, and preferably six-sided, to prevent the inserted bung from turning when screwing on the tightening nuts or plugs. I then shape the lining at F, immediately below the flange C, to fit the said holes, and with screw-threads from there to the end, passing it through them, with a packing-washer, G, of suitable substance, interposed between the flange and the inner surface of the lining, and tighten the whole by a nut, H, screwed upon the outside.

I is a cap, having a screw-thread cut upon the inner surface of its sides, whereby it is adapted to be removably attached to the bung-tube A to cover its outer end.

This method of fastening is applicable to all connections of like character it may be desirable to make to sheet-metal vessels of this character, and whether lined or not.

Having thus described my invention, what I claim as new, and desire to secure by Letters Patent, is—

The tube A, having an exterior screw-thread on its outer and a flange, C, on its inner end, the cap I, screw-nut H, bush D, and packing G, whereby the exterior and interior walls of the vessel are embraced, all constructed, arranged, and operating together as and for the purpose specified.

WILLIAM GEE.

Witnesses:
 FRANK BLOCKLEY,
 ALEX. F. ROBERTS.